(12) United States Patent
Cleary et al.

(10) Patent No.: US 9,387,651 B2
(45) Date of Patent: Jul. 12, 2016

(54) METHODS FOR PRODUCING ION EXCHANGED GLASS AND RESULTING APPARATUS

(71) Applicant: CORNING INCORPORATED, Corning, NY (US)

(72) Inventors: Thomas Michael Cleary, Elmira, NY (US); James Gregory Couillard, Ithaca, NY (US); Timothy Scott Huten, Big Flats, NY (US); Anurag Jain, Painted Post, NY (US); Brenna Marcellus, Corning, NY (US); Michael John Moore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 121 days.

(21) Appl. No.: 13/926,461

(22) Filed: Jun. 25, 2013

(65) Prior Publication Data

US 2014/0087159 A1    Mar. 27, 2014

Related U.S. Application Data

(63) Continuation-in-part of application No. 13/626,958, filed on Sep. 26, 2012.

(51) Int. Cl.
*B32B 17/10* (2006.01)
*C03C 21/00* (2006.01)
(Continued)

(52) U.S. Cl.
CPC ..... *B32B 17/10137* (2013.01); *B32B 17/10036* (2013.01); *B32B 17/10119* (2013.01); *B32B 17/10761* (2013.01); *C03C 3/085* (2013.01); *C03C 3/095* (2013.01); *C03C 21/002* (2013.01); *C03C 27/10* (2013.01); *Y10T 428/2495* (2015.01); *Y10T 428/24967* (2015.01); *Y10T 428/24983* (2015.01); *Y10T 428/269* (2015.01); *Y10T 428/315* (2015.01)

(58) Field of Classification Search
None
See application file for complete search history.

(56) References Cited

U.S. PATENT DOCUMENTS 3,282,772 A   11/1966   Davis .......................... 161/165
3,751,238 A    8/1973   Grego et al. ..................... 65/30
(Continued)

FOREIGN PATENT DOCUMENTS

WO    2010009154      1/2010
WO    2012037094 A2   3/2012
(Continued)

OTHER PUBLICATIONS

U.S. Appl. No. 61/653,865, filed May 31, 2012, Stiff Interlayers for Laminated Glass Structures.
(Continued)

*Primary Examiner* — David Sample
(74) *Attorney, Agent, or Firm* — Payal A. Patel

(57) ABSTRACT

A laminate structure having a first glass layer, a second glass layer, and at least one polymer interlayer intermediate the first and second glass layers. The first glass layer is comprised of a thin, chemically strengthened glass having a surface compressive stress of between about 250 MPa and about 350 MPa and a depth of layer (DOL) of compressive stress greater than about 60 μm. The second glass layer can also be comprised of a thin, chemically strengthened glass having a surface compressive stress of between about 250 MPa and about 350 MPa and a depth of layer (DOL) of compressive stress greater than about 60 μm.

29 Claims, 7 Drawing Sheets

(51) Int. Cl.
*C03C 27/10* (2006.01)
*C03C 3/085* (2006.01)
*C03C 3/095* (2006.01)

(56) References Cited

U.S. PATENT DOCUMENTS

| | | | |
|---|---|---|---|
| 3,781,184 A | 12/1973 | Domicone et al. | 161/165 |
| 4,483,700 A | 11/1984 | Forker, Jr. et al. | 65/30.14 |
| 5,674,790 A | 10/1997 | Araujo | 501/66 |
| 5,928,793 A * | 7/1999 | Kimura | 428/428 |
| 6,270,605 B1 | 8/2001 | Doerfler | 156/102 |
| 6,516,634 B1 * | 2/2003 | Green et al. | 65/30.14 |
| 7,508,406 B2 | 3/2009 | Oehrlein | 347/224 |
| 7,666,511 B2 | 2/2010 | Ellison et al. | 428/426 |
| 2005/0084679 A1 | 4/2005 | Sglavo et al. | |
| 2005/0284179 A1 | 12/2005 | Isono et al. | |
| 2007/0060465 A1 | 3/2007 | Varshneya et al. | |
| 2009/0215607 A1 | 8/2009 | Dejneka et al. | |
| 2009/0220761 A1 | 9/2009 | Dejneka et al. | |
| 2010/0009154 A1 | 1/2010 | Allan et al. | 428/220 |
| 2010/0028607 A1 | 2/2010 | Lee et al. | |
| 2010/0167059 A1 | 7/2010 | Hashimoto et al. | |
| 2010/0291353 A1 | 11/2010 | Dejneka et al. | |
| 2011/0045961 A1 | 2/2011 | Dejneka et al. | |
| 2011/0165393 A1 * | 7/2011 | Bayne et al. | 428/215 |
| 2011/0241977 A1 | 10/2011 | Powell | |
| 2011/0293942 A1 | 12/2011 | Cornejo et al. | |
| 2011/0294648 A1 | 12/2011 | Chapman et al. | |
| 2011/0294649 A1 | 12/2011 | Gomez et al. | |
| 2012/0034435 A1 | 2/2012 | Borrelli et al. | |
| 2012/0052275 A1 | 3/2012 | Hashimoto et al. | 428/215 |
| 2012/0085130 A1 * | 4/2012 | Hill et al. | 65/30.14 |
| 2012/0094084 A1 * | 4/2012 | Fisher et al. | 428/174 |
| 2012/0131961 A1 | 5/2012 | Dannoux et al. | |
| 2012/0135195 A1 | 5/2012 | Glaesemann et al. | |
| 2012/0328843 A1 * | 12/2012 | Cleary et al. | 428/174 |
| 2013/0164483 A1 | 6/2013 | Cites et al. | |
| 2013/0295357 A1 * | 11/2013 | Cleary et al. | 428/215 |

FOREIGN PATENT DOCUMENTS

| | | | |
|---|---|---|---|
| WO | WO2012/037094 | 3/2012 | C03C 21/00 |
| WO | WO2012/051038 | 4/2012 | B32B 17/10 |
| WO | WO2012/082528 | 6/2012 | C03C 3/087 |
| WO | WO2013191200 A1 | 12/2013 | |

OTHER PUBLICATIONS

International Search Report and Written Opinion, International Application No. PCT/US2014/043619, International Filing Date Sep. 19, 2014.

Patent Cooperation Treaty International Notification of Transmittal of the International Search Report and The Written Opinion of the International Searching Authority, international application No. PCT/US2013/061164: mailing date Dec. 20, 2013, 9 pages.

* cited by examiner

LOAD (kg)

Boxplot of MOR (MPa)

METHODS FOR PRODUCING ION EXCHANGED GLASS AND RESULTING APPARATUS

RELATED APPLICATIONS

The present application is a continuation-in-part application of, co-pending with, and claims the priority benefit of the non-provisional application entitled, "Methods for Producing Ion Exchanged Glass and Resulting Apparatus," application Ser. No. 13/626,958, filed on Sep. 26, 2012, the entirety of which is incorporated herein by reference.

BACKGROUND

1. Field of the Disclosure

The embodiments disclosed herein relate to methods for producing ion exchanged glass, especially such glass with characteristics of moderate compressive stress, high depth of compressive layer, and/or desirable central tension.

2. Related Discussion

Glass laminates can be used as windows and glazing in architectural and vehicle or transportation applications, including automobiles, rolling stock, locomotive and airplanes. Glass laminates can also be used as glass panels in balustrades and stairs, and as decorative panels or coverings for walls, columns, elevator cabs, kitchen appliances and other applications. As used herein, a glazing or a laminated glass structure is a transparent, semi-transparent, translucent or opaque part of a window, panel, wall, enclosure, sign or other structure. Common types of glazing that are used in architectural and/or vehicle applications include clear and tinted laminated glass structures.

Conventional automotive glazing constructions may consist of two plies of 2 mm soda lime glass with a polyvinyl butyral (PVB) interlayer. These laminate constructions have certain advantages, including, low cost, and a sufficient impact resistance for automotive and other applications. However, because of their limited impact resistance and higher weight, these laminates usually exhibit poor performance characteristics, including a higher probability of breakage when struck by roadside debris, vandals and other objects of impact and lower fuel efficiencies for a respective vehicle.

In applications where strength is important (such as the above automotive application), the strength of conventional glass may be enhanced by several methods, including coatings, thermal tempering, and chemical strengthening (ion exchange). Thermal tempering is commonly used with thick, monolithic glass sheets, and has the advantage of creating a thick compressive layer through the glass surface, typically 20 to 25% of the overall glass thickness. Disadvantageously, however, the magnitude of the compressive stress is relatively low, typically less than 100 MPa. Furthermore, thermal tempering becomes increasingly ineffective for relatively thin glass, such as less than about 2 mm.

In contrast, ion exchange (IX) techniques can produce high levels of compressive stress in the treated glass, as high as about 1000 MPa at the surface, and is suitable for very thin glass. Disadvantageously, however, ion exchange is limited to relatively shallow compressive layers, typically on the order of tens of micrometers or so. The high compressive stress may result in very high blunt impact resistance, which might not pass particular safety standards for automotive applications, such as the ECE (UN Economic Commission for Europe) R43 Head Form Impact Test, where the glass is required to break at a certain impact load to prevent injury. Conventional research and development efforts have been focused on controlled or preferential breakage of vehicular laminates at the expense of impact resistance thereof.

Although the conventional single step ion exchange processes may employ a long ion exchange step to achieve a higher depth of compressive layer (DOL), such lengthy durations also result in a rise in the central tension (CT) past a chosen frangibility limit of the glass, resulting in undesirable fragmentation of the glass. By way of example, it has been newly discovered by experimentation that a 4 inch×4 inch×0.7 mm sheet of Corning® Gorilla Glass® will, upon fracture, exhibit undesirable fragmentation (energetic failure into a large number of small pieces) when a long single step ion exchange process (8 hours at 475° C.) has been performed in pure $KNO_3$. Indeed, although a DOL of about 101 µm was achieved, a relatively high CT of 65 MPa results, which was higher than the desired frangibility limit (48 MPa) of the subject glass sheet.

Further, it has been newly discovered that installed automotive glazing (using ion exchanged glass) may develop external scratches as deep as about 75 µm due to exposure to environmental abrasive materials such as silica sand, flying debris, etc. This depth will exceed the typical depth of compressive layer (e.g., a few tens of micrometers), which could lead to the glass unexpectedly fracturing.

In view of the foregoing, new methods and apparatus are needed to address certain glass applications, where moderate compressive stress, high depth of compressive layer, and/or desirable central tension are important considerations.

SUMMARY

In accordance with one or more embodiments herein, methods and apparatus provide for a thin glass article with a layer of surface compression from ion exchange techniques, which enables scratch and impact resistance. The glass article exhibits a relatively high depth of compressive layer (DOL), making it resistant to environmental damage. Notably, the compressive stress (CS) at the glass surface is lower than in traditional ion exchanged glass, which allows the glass to pass automotive impact safety standards (such as the ECE R43 head form impact test) and is therefore suitable for automotive glazing applications.

By way of example, one or more embodiments may involve an ion exchange process for obtaining thin glass with moderate CS and high DOL, including: (i) an ion exchange step, and (ii) an anneal step.

In accordance with one or more embodiments, methods and apparatus provide for and/or result in a product by performing one or more actions, including: performing an ion exchange process by immersing a glass sheet into a molten salt bath at one or more first temperatures for a first period of time such that ions within the glass sheet proximate to a surface thereof are exchanged for larger ions from the molten salt bath, thereby producing: (i) an initial compressive stress (iCS) at the surface of the glass sheet, (ii) an initial depth of compressive layer (iDOL) into the glass sheet, and (iii) an initial central tension (iCT) within the glass sheet. The actions may further include annealing the glass sheet, after the ion exchange process has been completed, by elevating the glass sheet to one or more second temperatures for a second period of time such that at least one of the initial compressive stress (iCS), the initial depth of compressive layer (iDOL), and the initial central tension (iCT) are modified.

The actions may further provide that during the ion exchange process, at least one of: (i) the molten salt bath includes $KNO_B$, (ii) the one or more first temperatures are within the range of about 370-500° C., and (iii) the first time period is within the range of about 4-24 hours, such as about 8 hours.

The actions may further provide that during the annealing process, at least one of: (i) the anneal process is carried out in an air environment; (ii) the one or more second temperatures are within the range of about 400-550° C., and (iii) the second time period is within the range of about 0.5-24 hours, such as about 8 hours.

The actions may further provide that after the ion exchange process, the initial compressive stress (iCS) exceeds a predetermined value, and after the annealing process the initial compressive stress (iCS) is reduced to a final compressive stress (fCS) which is at or below the predetermined value.

The actions may further provide that after the ion exchange process, the initial depth of compressive layer (iDOL) is below a predetermined value, and after the annealing process the initial depth of compressive layer (iDOL) is increased to a final depth of compressive layer (fDOL) which is at or above the predetermined value.

The actions may further provide that after the ion exchange process, the initial central tension (iCT) exceeds a predetermined value, and after the annealing process the initial central tension (iCT) is reduced to a final central tension (fCT) which is at or below the predetermined value.

The actions may further provide that the initial compressive stress (iCS) is at or greater than about 500 MPa, and the final compressive stress (fCS) is at or less than about 400 MPa, such as less than about 350 MPa, or less than about 300 MPa.

The actions may further provide that the initial depth of compressive layer (iDOL) at or less than about 75 μm, with about 40 μm being typical, and the final depth of compressive layer (fDOL) is at or above about 90 μm, or at or above about 80 μm.

The actions may further provide that the initial central tension (iCT) is at or above a chosen desired frangibility limit of the glass sheet, and the final central tension (fCT) is below the chosen frangibility limit of the glass sheet.

By way of example, an apparatus produced using one or more embodiments herein may include a glass sheet having: (i) a compressive stress (CS) at a surface of the glass sheet, having been subject to ion exchange, that is at or less than about 400 MPa, or less than about 350 MPa, or less than about 300 MPa, (ii) a depth of compressive layer (DOL) into the glass sheet that is at or above about 80 μm, or at or above about 90 μm, and (iii) a central tension (CT) within the glass sheet that is below a chosen frangibility limit of the glass sheet.

An exemplary embodiment provides a light-weight glass laminate having at least one ply of chemically strengthened glass, such as Gorilla® Glass, that can be designed and manufactured with appropriate surface compressive stress levels of the two plies to ensure fracture thereof when evaluated in a ECE R43 headform test. Additional embodiments can include two plies of 0.7 mm thick chemically strengthened glass having a surface residual CS of between about 250 MPa to about 350 MPa and preferably about 300 MPa and having a DOL of at least 60 microns. These two glass plies can then be joined by an interlayer material such as, but not limited to, a 0.8 mm thick poly-vinyl butyral or other polymeric interlayer material.

Another embodiment provides a laminate structure having a first glass layer, a second glass layer, and at least one polymer interlayer intermediate the first and second glass layers. The first glass layer can be comprised of a thin, chemically strengthened glass having a surface compressive stress of between about 250 MPa and about 350 MPa and a depth of layer (DOL) of compressive stress greater than about 60 μm.

A further embodiment provides a laminate structure having a first glass layer, a second glass layer, and at least one polymer interlayer intermediate the first and second glass layers. The first glass layer can be comprised of a thin, chemically strengthened glass having a surface compressive stress of between about 250 MPa and about 350 MPa and a depth of layer (DOL) of compressive stress greater than about 60 μm, and the second glass layer can be comprised of a thin, chemically strengthened glass having a surface compressive stress of between about 250 MPa and about 350 MPa and a DOL of compressive stress greater than about 60 μm.

Other aspects, features, and advantages of the embodiments disclosed and discussed herein will be apparent to one skilled in the art from the description herein taken in conjunction with the accompanying drawings.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
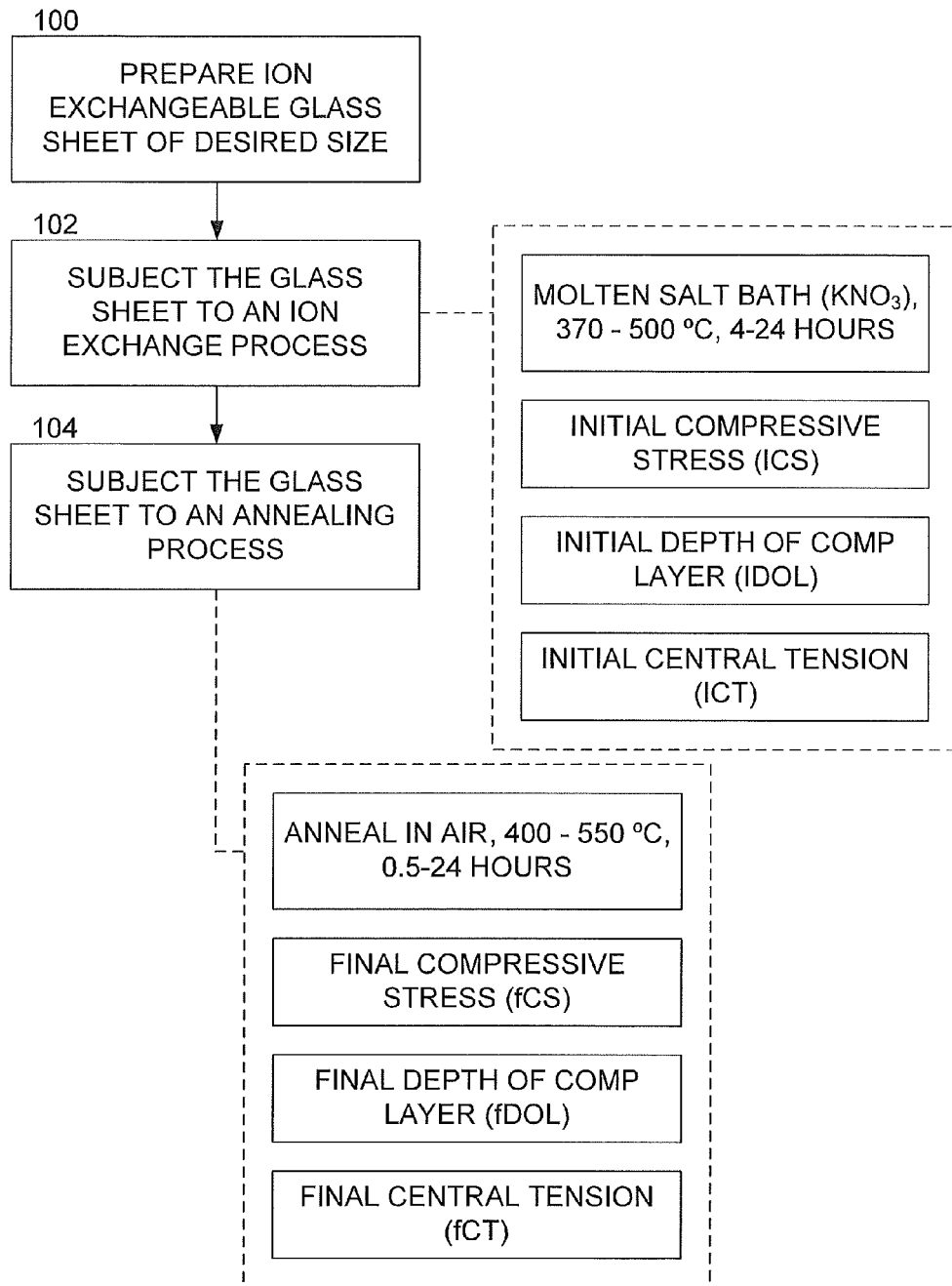
FIG. 1 is a flow diagram illustrating one or more process steps that may be carried out in accordance with one or more embodiments disclosed herein.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and may include modification thereto and permutations thereof.

With reference to the drawings wherein like numerals indicate like elements there is shown in FIG. 1 a flow diagram illustrating one or more process steps that may be carried out in accordance with one or more embodiments disclosed herein.

The embodiments herein involve the application of one or more novel processes for producing a relatively thin glass sheet (on the order of about 2 mm or less) having certain characteristics, such as relatively moderate compressive stress (CS), relatively high depth of compressive layer (DOL), and/or moderate central tension (CT). The process begins with preparing a glass sheet that is capable of ion exchange (step 100). Details concerning the properties of the glass sheet as concerns ion exchange will be discussed later herein. Next, the glass sheet is subject to an ion exchange process (step 102), and thereafter the glass sheet is subject to an anneal process (step 104).

The ion exchange process 102 may involve at least one of: (i) subjecting the glass sheet to a molten salt bath including $KNO_3$, preferably relatively pure $KNO_3$, (ii) one or more first temperatures within the range of about 400-500° C., and (iii) a first time period within the range of about 4-24 hours, such as about 8 hours. It is noted that other salt bath compositions are possible and would be within the skill level of an artisan to consider such alternatives. The ion exchange process will produce: (i) an initial compressive stress (iCS) at the surface of the glass sheet, (ii) an initial depth of compressive layer (iDOL) into the glass sheet, and (iii) an initial central tension (iCT) within the glass sheet.

In general, after the ion exchange process, the initial compressive stress (iCS) will likely exceed a predetermined (or desired) value, such as being at or greater than about 500 MPa, and will typically reach 600 MPa or higher, and may even reach 1000 MPa or higher in some glasses and under some processing profiles. Alternatively and/or additionally, after the ion exchange process, the initial depth of compressive layer (iDOL) will likely be below a predetermined (or desired) value, such as being at or less than about 75 μm or even lower in some glasses and under some processing profiles. Alternatively and/or additionally, after the ion exchange process, the initial central tension (iCT) will likely exceed a predetermined (or desired) value, such as exceeding a chosen frangibility limit of the glass sheet, which may be at or exceeding about 40 MPa, or more particularly at or exceeding about 48 MPa in some glasses.

The fact that the initial compressive stress (iCS) may exceed a desired value, the initial depth of compressive layer (iDOL) may be below a desired value, and/or the initial central tension (iCT) may exceed a desired value, may lead to some undesirable characteristics in a final product made using the glass sheet. For example, if the initial compressive stress (iCS) exceeds a desired value (reaching for example, 1000 MPa), then facture of the glass under certain circumstances might not occur. Although such may be counter-intuitive, in some circumstances one may wish for the glass sheet to break, such as in an automotive glass application where the glass must break at a certain impact load to prevent injury.

Further, if the initial depth of compressive layer (iDOL) is below a desired value, then under certain circumstances the glass sheet may break unexpectedly and under undesirable circumstances. Indeed, typical ion exchange processes result in the initial depth of compressive layer (iDOL) being no more than about 70-75 μm, which may be less than the depth of scratches, pits, dings, etc., that may develop in the glass sheet during use. For example, it has been discovered by our experimentation that installed automotive glazing (using ion exchanged glass) may develop external scratches reaching as deep as about 75 μm or more due to exposure to abrasive materials such as silica sand, flying debris, etc., within the environment in which the glass sheet may be used. This depth may very well exceed the typical depth of compressive layer, which could lead to the glass unexpectedly fracturing during use into a high piece count.

Finally, if the initial central tension (iCT) exceeds a desired value, such as reaching or exceeding a chosen frangibility limit of the glass, then the glass sheet may break unexpectedly and under undesirable circumstances. For example, we have discovered through experimentation that a inch×4 inch×0.7 mm sheet of Corning® Gorilla Glass® exhibits performance characteristics in which undesirable fragmentation (energetic failure into a large number of small pieces when broken) occurs when a long single step ion exchange process (8 hours at 475° C.) has been performed in pure $KNO_3$. Although a DOL of about 101 μm was achieved, a relatively high CT of 65 MPa resulted, which was higher than the chosen frangibility limit (48 MPa) of the subject glass sheet.

In accordance with one or more embodiments, however, after the glass sheet has been subject to ion exchange, the glass sheet is subject to the annealing process 104 by elevating the glass sheet to one or more second temperatures for a second period of time. For example, the annealing process 104 may include at least one of: (i) that the process is carried out in an air environment; (ii) that the one or more second temperatures are within the range of about 400-500° C., and (iii) that the second time period is within the range of about 4-24 hours, such as about 8 hours. The annealing process 104 causes at least one of the initial compressive stress (iCS), the initial depth of compressive layer (iDOL), and the initial central tension (iCT) to be modified.

For example, after the annealing process 104, the initial compressive stress (iCS) is reduced to a final compressive stress (fCS) which is at or below the predetermined value. By way of example, the initial compressive stress (iCS) may be at or greater than about 500 MPa, but the final compressive stress (fCS) may be at or less than about 400 MPa, 350 MPa, or 300 MPa. It is noted that the target for the final compressive stress (fCS) will be a function of glass thickness because in thicker glass a lower fCS will often be desirable, and in thinner glass a higher fCS may be tolerable.

Additionally and/or alternatively, after the annealing process 104, the initial depth of compressive layer (iDOL) is increased to a final depth of compressive layer (fDOL) which is at or above the predetermined value. By way of example, the initial depth of compressive layer (iDOL) may be at or less than about 75 μm, and the final depth of compressive layer (fDOL) may be at or above about 80 μm or 90 μm, such as 100 μm or more.

Additionally and/or alternatively, after the annealing process 104, the initial central tension (iCT) may be reduced to a final central tension (fCT) which is at or below the predetermined value. By way of example, the initial central tension (iCT) may be at or above a chosen frangibility limit of the glass sheet (such as between about 40-48 MPa), and the final central tension (fCT) is below the chosen frangibility limit of the glass sheet.

Figure 2:
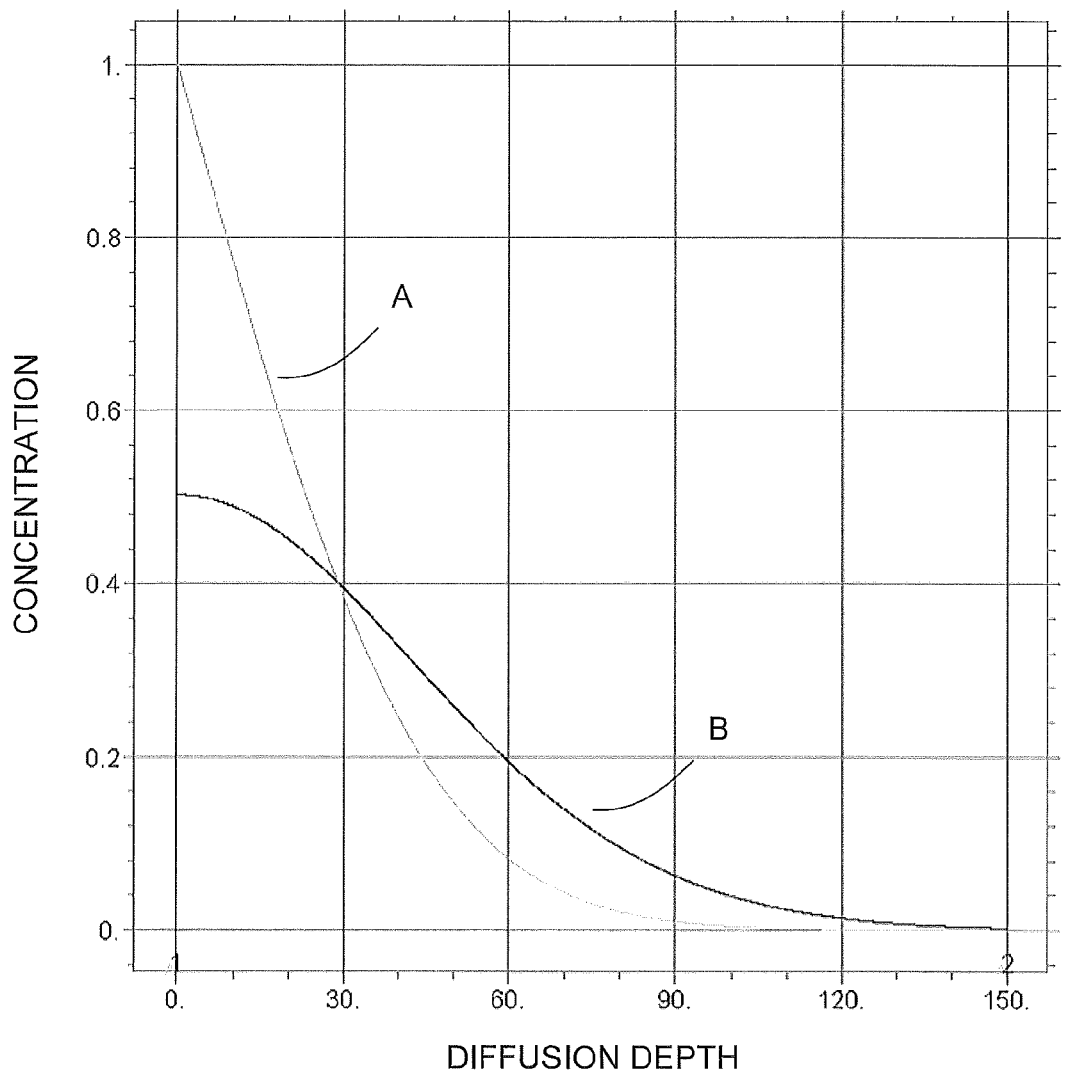
FIG. 2 is a graph illustrating changes in one or more characteristics of a glass sheet that has been subject to one or more of the process steps of FIG. 1.

To illustrate the above characteristics of the glass sheet as between pre- and post-anneal conditions, reference is made to FIG. 2, which is a graph illustrating changes in a potassium profile in a glass sheet. The glass sheet was a 4 inch×4 inch× 0.7 mm sheet of Corning® Gorilla Glass®, which was subject to ion exchange in a molten salt bath of $KNO_3$ at 460° C. for 6 hours, followed by an anneal in air at 455° C. for 6 hours. The plot labeled A illustrates a simulation of the potassium profile in the glass sheet after ion exchange, but before the anneal process. The plot labeled B illustrates a simulation of the potassium profile in the glass sheet after the anneal process. The potassium profiles are illustrated as concentrations (normalized units) versus the diffusion depth in μm. Notably, there is a marked reduction in surface concentration (with corresponding reduction in compressive stress) and increase in diffusion depth after the anneal process.

Figure 3:
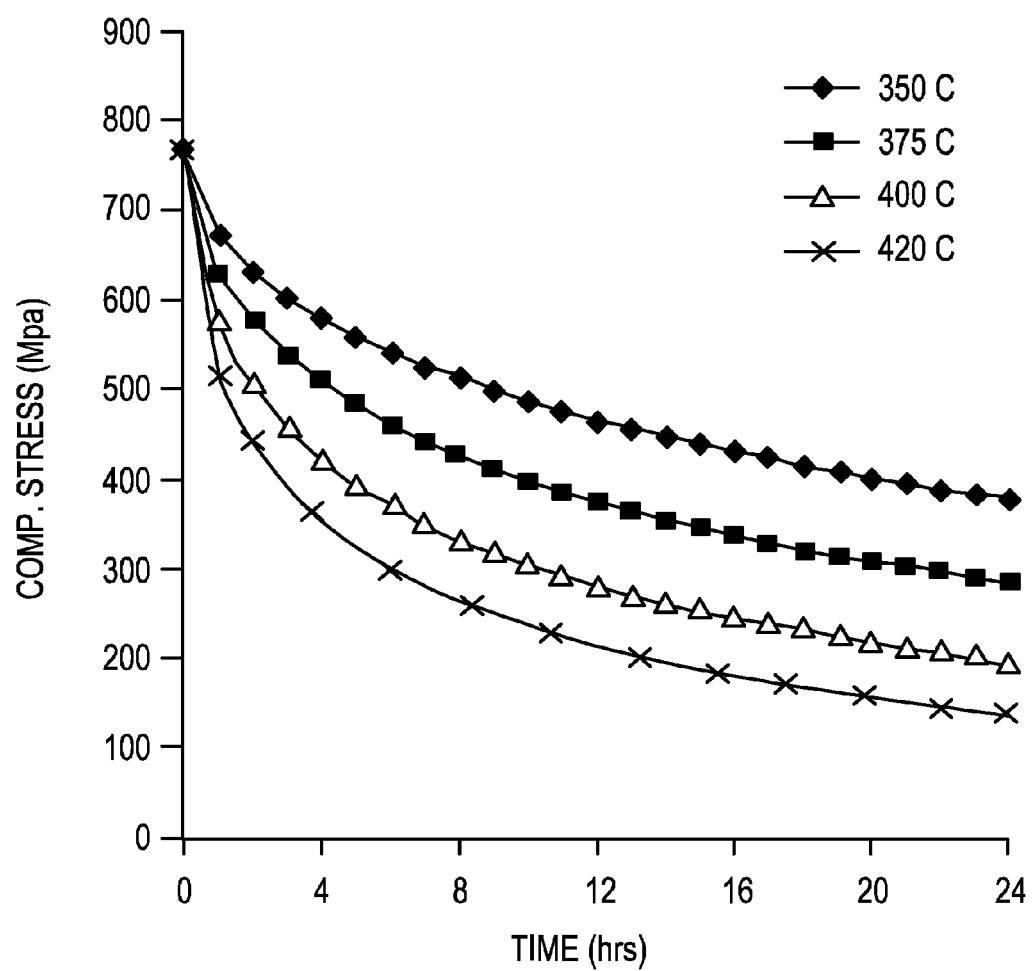
FIG. 3 is a graph illustrating changes in the compressive stress of a surface of the glass sheet that has been subject to one or more of the process steps of FIG. 1.

To further illustrate the changes in the characteristics of the glass sheet as between pre- and post-anneal conditions, reference is made to FIG. 3, which is a graph illustrating changes in the compressive stress (CS) of the surfaces of a number of glass sheets subject to differing anneal conditions. The glass sheets were each 4 inch×4 inch×0.7 mm in dimension formed from Corning® Gorilla Glass®. Each sheet was subject to ion exchange in a molten salt bath of $KNO_3$ at 460° C. for 6 hours, followed by annealing in air at varying temperatures for 6 hours. The various anneal temperatures were 350° C., 375° C., 400° C., and 420° C. Each glass sheet started with an initial compressive stress (iCS) of about 760 MPa just after the ion exchange process. During the annealing process, however, each glass sheet exhibited a lowering of the compressive stress as a function of time and temperature, yielding a final compressive stress (fCS) significantly below the iCS.

Figure 4:
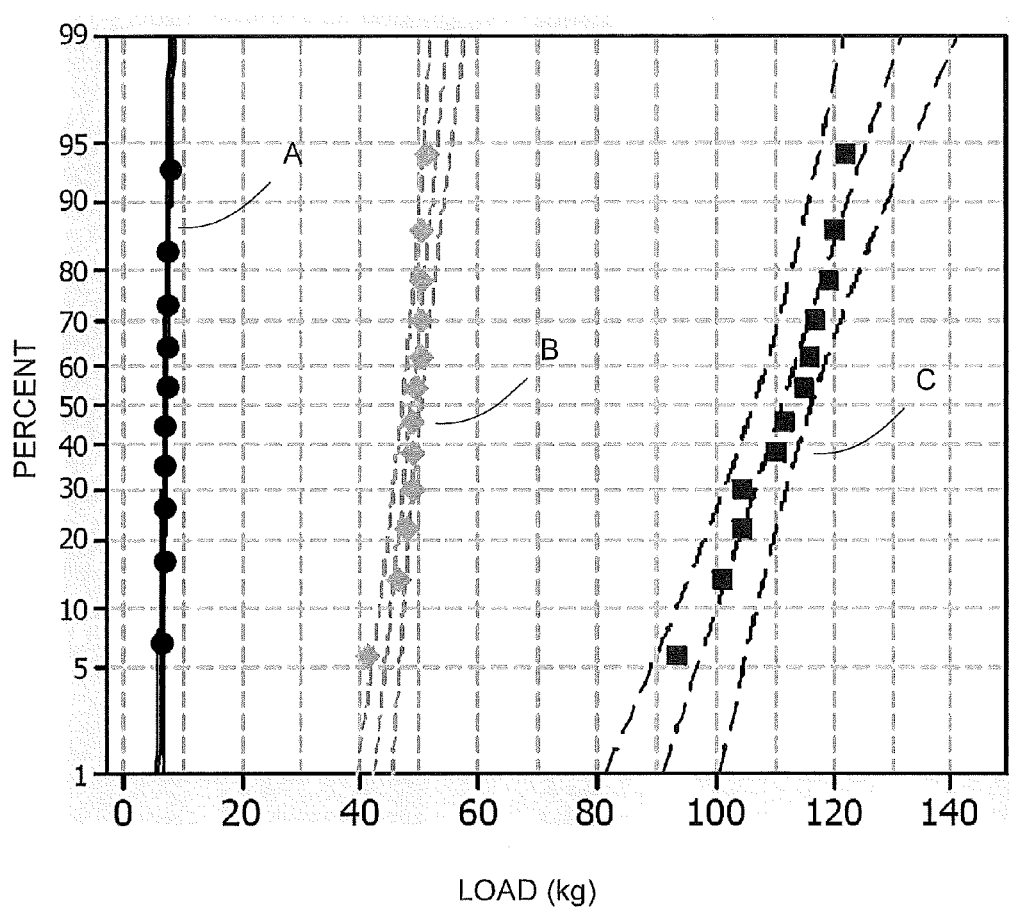
FIG. 4 is a graph illustrating changes in the fracturing load for numerous glass sheets that have been subject to one or more of the process steps of FIG. 1 as compared with glass sheets that have not been processed.

To still further illustrate the changes in the characteristics of the glass sheet as between pre- and post-anneal conditions, reference is made to FIG. 4, which is a graph illustrating changes in the fracturing load for numerous glass sheets that have been subject to ion exchange followed by annealing. The glass sheets were each 4 inch×4 inch×0.7 mm in dimension formed from Corning® Gorilla Glass®. Each sheet was subject to ion exchange in a molten salt bath of $KNO_3$ at 465° C. for 8 hours, followed by annealing in air at 460° C. for 5.5 hours. The glass sheets were subject to an abraded ring-on-ring failure load. A baseline is illustrated by the plot labeled A illustrating the breakage characteristics of ten as-drawn glass sheets. The plot A shows a mean fracture load of 7.144 kg, a standard deviation of 0.4355, an AD-value of 0.335, and a P-value of 0.430. After ion exchange but without annealing, twelve glass sheets were tested and, as illustrated in the plot labeled C, found to exhibit a mean fracture load of 111.3 kg, a standard deviation of 8.713, an AD-value of 0.321, and P-value of 0.482. After ion exchange and annealing, twelve glass sheets were tested and, as illustrated in the plot labeled B, found to exhibit a mean fracture load of 48.72 kg, a standard deviation of 2.681, an AD-value of 1.085, and P-value of less than 0.005.

In accordance with a general approach to establishing the parameters of the ion exchange and annealing processes, the conditions of each process step are adjusted based on the desired compressive stress (CS) at the glass surface, the desired depth of compressive layer (DOL), and the desired central tension (CT). In the ion exchange step, the time and temperature are chosen based on known experimental response models to reach a certain DOL. Thereafter, the time and temperature of the annealing step are chosen to achieve the desired final values of the compressive stress (CS), the depth of compressive layer (DOL), and the central tension (CT). Since air anneal processes are, in general, less costly than ion exchange processes, due to simpler capital equipment and reduced consumable costs, the respective time and temperature parameters of the ion exchange versus anneal can be balanced to optimize throughput and cost.

EXAMPLE 1

In a first example, a 4 inch×4 inch×0.7 mm glass sheet of Corning® Gorilla Glass® (Code 2318) was subject to ion exchange in a molten salt bath of 100% $KNO_3$ at 460° C. for 6 hours, followed by annealing in air at 455° C. for 6 hours.

After ion exchange but before annealing, the glass sheet exhibited an initial compressive stress (iCS) of about 620 MPa and an initial depth of compressive layer (iDOL) of about 71.5 μm. The iDOL was lower than would be desired in a final article, however, in accordance with the embodiments discussed herein it was known that the DOL would increase during the anneal process. The temperature of the ion exchange process was chosen to reach a target for the iDOL in a reasonable time for manufacturing throughput, while staying below 480° C. to limit breakdown of the chemical bath. It is noted that depth of compressive layer (DOL) may be measured from the glass index, such as using a FSM-6000 or equivalent. The so-called "true DOL" for physical performance, defined as the depth at which the internal stress changes from compression to tension, will likely be shallower for most if not all glasses.

After ion exchange but before annealing, the glass sheet exhibited an initial compressive stress (iCS) that was lower than desired in the final product, and which was lower than would be achieved in glass sheets ion exchanged to shallower iDOLs. However, the iCS was still significant, i.e., about 620 MPa in the example. As noted above, the temperature of the ion exchange process was chosen to reach a target for the iDOL, but such choice also affected the iCS, and therefore it is noted that such choice may be a consideration in setting process parameters.

After ion exchange but before annealing, the glass sheet exhibited a relatively high initial central tension (iCT), which was higher than desired in the final article, however it was understood that the CT would decrease during the anneal process. The iCT was about 56 MPa in the example. With such a high CT (exceeding the chosen frangibility limit of the glass), if a flaw penetrated the DOL the glass would fracture due to the stored energy from the CT. It has been shown that above a certain minimum CT the piece count in broken glass is proportional to $CT^4$, so a high CT may be undesirable. The critical CT for high piece count fragmentation varies with glass thickness. In a 0.7 mm thick glass sheet of Code 2318 glass, it has been found experimentally that a CT of less than 48 MPa will not break into multiple pieces from a single sharp flaw. As noted above, the temperature of the ion exchange process was chosen to reach a target for the iDOL, but such choice also affects the iCT, and therefore it is noted that such choice may be a consideration in setting process parameters.

Notably, the central tension (CT) is the dominant factor in determining breakage behavior. The CT is frequently approximated as $CT=(CS*DOL)/(L-2*DOL)$, where L is the glass thickness. This approximation becomes increasingly inaccurate as the DOL increases and the concentration profile evolves during the anneal process. A more accurate measure of the central tension (CT) is the internal stress required such that the total stress within the part integrates to zero.

As noted above, the post ion exchange annealing process serves to increase the iDOL, while lowering the iCS and iCT. After the anneal of 6 hours at 455° C., the final compression stress (fCS) was about 227 MPa, the final depth of compressive layer (fDOL) was about 100 μm, and the final central tension (CT) was 42 MPa. The time of the annealing process was made equal to the ion exchange period to balance the manufacturing throughput conditions. The temperature was chosen to achieve a final depth of compressive layer (fDOL) of about 100 μm, and a final central tension (fCT) of less than about 48 MPa. The particular temperature may be estimated through simulation or trial and error. The final compressive stress (fCS) remained higher than that of bare or thermally tempered glass, and the resulting fDOL was greater than the depth of flaws typically found in some applications, such as auto glazing. Thus, if a flaw penetrates the fDOL, the low fCT should prevent undesirable fragmentation of the glass, which could obscure vision or release glass chips. The reduction in fCS lowers the load at which the glass will break to a desired level.

EXAMPLE 2

In a second example, a number of 1100×500 mm×0.7 mm glass sheets of Corning® Gorilla Glass® (Code 2318) were subject to ion exchange in a molten salt bath of 100% $KNO_3$ at 420° C. for 9.5 hours. This resulted in an initial compressive stress (iCS) of about 630 MPa and an initial depth of compressive layer (iDOL) of about 57 μm in each glass sheet. Two of the glass sheets were not annealed, and were laminated together using PVB. Ten of the glass sheets were annealed in air at 420° C. for 10 hours, and pairs of the ten sheets were laminated together using PVB. The anneal resulted in a final compressive stress (fCS) of about 290 MPa and a final depth of compressive layer (fDOL) of about 92 μm in each glass sheet.

The respective laminated structures were subject to automotive impact safety standard testing, i.e., ECE (UN Economic Commission for Europe) R43 headform impact testing. The test includes dropping a 10 Kg wooden headform from a height of 1.5 meters onto each laminated structure. In order to pass the test, the laminated structure must yield and break displaying numerous circular cracks centered approximately on the point of impact. Due to the high strength (the high iCS) of the laminated structure in which the annealing process was not performed, the structure failed to break within limits during the test. Each of the five laminated structures subject to the annealing process, however, fractured within specified limits and passed the regulatory test.

The processes described herein permit the formation of a thin glass article with a layer of surface compression, enabling higher retained strength and impact resistance over non-strengthened glass. The final compressive stress at the glass surface (fCS) is lower than in traditional ion exchange, which allows the glass to pass maximum strength and frangibility limits in applications where this is desirable. However the glass also retains a high final depth of compressive layer (fDOL), making it resistant to environmental damage.

The processes described herein may be suitable for a range of applications. One application of particular interest is for automotive glazing applications, whereby the process enables production of glass which can pass automotive impact safety standards. Other applications may be identified by those knowledgeable in the art.

Figure 5:
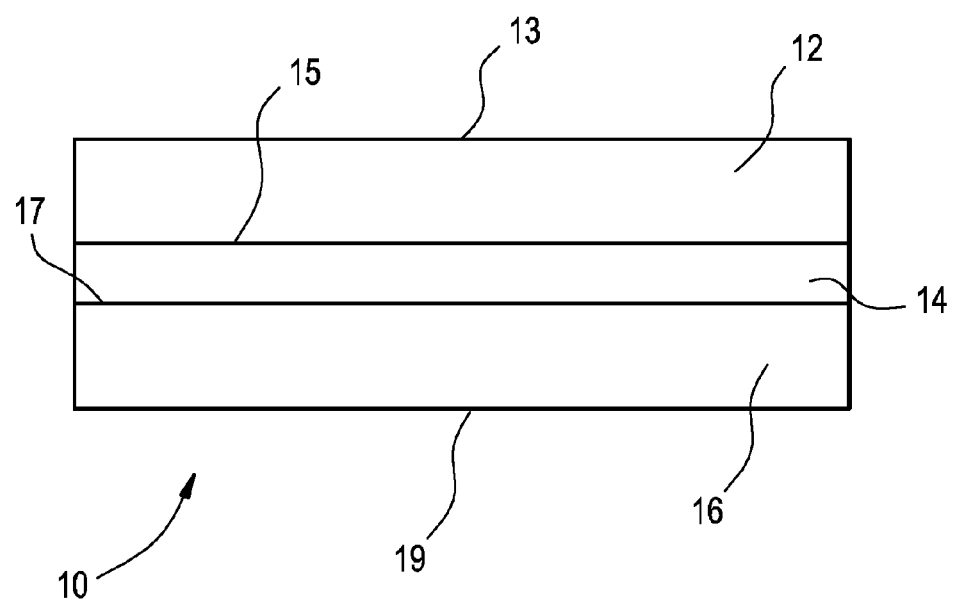
FIG. 5 is a cross sectional illustration of some embodiments of the present disclosure.
Figure 6:
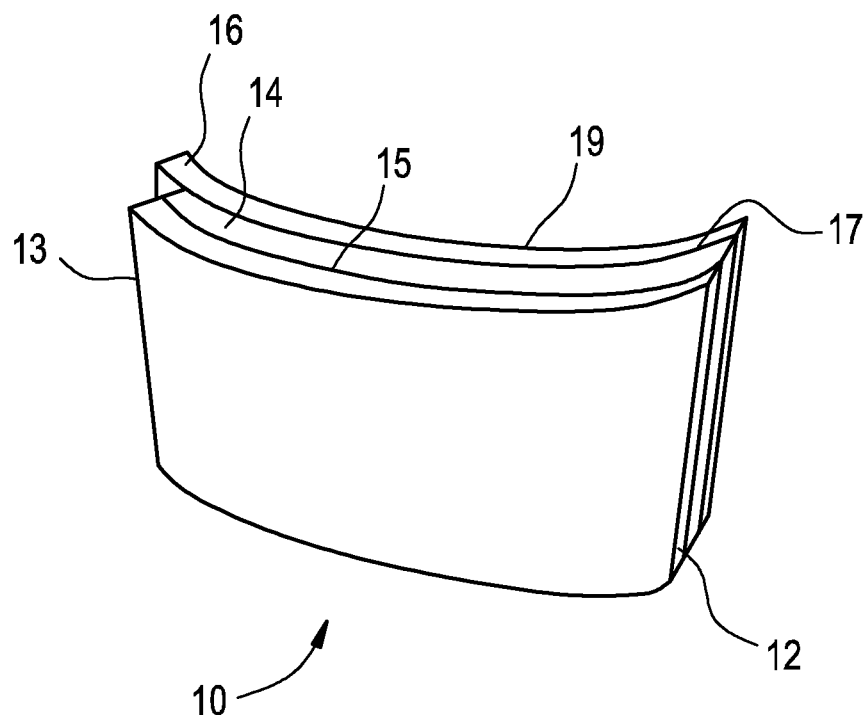
FIG. 6 is a perspective view of additional embodiments of the present disclosure.

FIG. 5 is a cross sectional illustration of some embodiments of the present disclosure. FIG. 6 is a perspective view of additional embodiments of the present disclosure. With reference to FIGS. 5 and 6, an exemplary embodiment can include two layers of chemically strengthened glass, e.g., Gorilla® Glass, that have been heat treated, ion exchanged and annealed, as described above. Exemplary embodiments can possess a surface compression or compressive stress of approximately 300 MPa and a DOL of greater than about 60 microns. In a preferred embodiment, a laminate 10 can be comprised of an outer layer 12 of glass having a thickness of less than or equal to 1.0 mm and having a residual surface CS level of between about 250 MPa to about 350 MPa with a DOL of greater than 60 microns. In another embodiment the CS level of the outer layer 12 is preferably about 300 MPa. The laminate 10 also includes a polymeric interlayer 14 and an inner layer of glass 16 also having a thickness of less than or equal to 1.0 mm and having a residual surface CS level of between about 250 MPa to about 350 MPa with a DOL of greater than 60 microns. In another embodiment the CS level of the inner layer 16 is preferably about 300 MPa. In one embodiment, an interlayer 14 can have a thickness of approximately 0.8 mm. Exemplary interlayers 14 can include, but are not limited to poly-vinyl-butyral or other suitable polymeric materials. In additional embodiments, any of the surfaces of the outer and/or inner layers 12, 16 can be acid etched to improve durability to external impact events. For example, in one embodiment, a first surface 13 of the outer layer 12 is acid etched and/or another surface 17 of the inner layer is acid etched. In another embodiment, a first surface 15 of the outer layer is acid etched and/or another surface 19 of the inner layer is acid etched. Such embodiments can thus provide a laminate construction that is substantially lighter than conventional laminate structures and which conforms to regulatory impact requirements.

In another embodiment of the present disclosure, at least one layer of thin but high strength glass can be used to construct an exemplary laminate structure. In such an embodiment, chemically strengthened glass, e.g., Gorilla® Glass can be used for the outer layer 12 and/or inner layer 16 of glass for an exemplary laminate 10. In another embodiment, the inner layer 16 of glass can be conventional soda lime glass, annealed glass, or the like. Exemplary thicknesses of the outer and/or inner layers 12, 16 can range in thicknesses from 0.55 mm to 1.5 mm to 2.0 mm or more. Additionally, the thicknesses of the outer and inner layers 12, 16 can be different in a laminate structure 10. Exemplary glass layers can be made by fusion drawing, as described in U.S. Pat. Nos. 7,666,511, 4,483,700 and 5,674,790, the entirety of each being incorporated herein by reference, and then chemically strengthening such drawn glass. Exemplary glass layers 12, 16 can thus possess a deep DOL of CS and can present a high flexural strength, scratch resistance and impact resistance. Exemplary embodiments can also include acid etched or flared surfaces to increase the impact resistance and increasing the strength of such surfaces by reducing the size and severity of flaws on these surfaces. If etched immediately prior to lamination, the strengthening benefit of etching or flaring can be maintained on surfaces bonded to the inter-layer.

One embodiment of the present disclosure is directed to a laminate structure having a first glass layer, a second glass layer, and at least one polymer interlayer intermediate the first and second glass layers. The first glass layer can be comprised of a thin, chemically strengthened glass having a surface compressive stress of between about 250 MPa and about 350 MPa and a depth of layer (DOL) of CS greater than about 60 μm. In another embodiment, the second glass layer can be comprised of a thin, chemically strengthened glass having a surface compressive stress of between about 250 MPa and about 350 MPa and a depth of layer (DOL) of CS greater than about 60 μm. Preferable surface compressive stresses of the first and/or second glass layers can be approximately 300 MPa. In some embodiments, the thicknesses of the first and/or second glass layers can be a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm. Of course, the thicknesses and/or compositions of the first and second glass layers can be different from each other. Additionally, the surface of the first glass layer opposite the interlayer can be acid etched, and the surface of the second glass layer adjacent the interlayer can be acid etched. Exemplary polymer interlayers include materials such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof.

Another embodiment of the present disclosure is directed to a laminate structure having a first glass layer, a second glass layer, and at least one polymer interlayer intermediate the first and second glass layers. The first and second glass layers can be comprised of a thin, chemically strengthened glass having a surface compressive stress of between about 250 MPa and about 350 MPa and a depth of compressive layer (DOL) of greater than about 60 μm. Preferable surface compressive stresses of the first and/or second glass layers can be approximately 300 MPa. In some embodiments, the thicknesses of the first and/or second glass layers can be a thickness not exceeding 1.5 mm, a thickness not exceeding 1.0 mm, a thickness not exceeding 0.7 mm, a thickness within a range from about 0.5 mm to about 1.0 mm, a thickness from about 0.5 mm to about 0.7 mm. Of course, the thicknesses of the first and second glass layers can be different from each other. Additionally, the surface of the first glass layer opposite the interlayer can be acid etched, and the surface of the second glass layer adjacent the interlayer can be acid etched. In another embodiment, the surface of the first glass layer in contact with the interlayer can be acid etched, and the surface of the second glass layer opposite the interlayer can be acid etched. Exemplary polymer interlayers include materials such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. 10. The laminate structure of claim 1 wherein the first or second glass layer has a central tension (CT) that is below a predetermined frangibility limit.

Concerns related to damage levels of impact injuries to a vehicle occupant has required a relatively easier breakage for automotive glazing products. For example, in ECE R43 Revision 2, there is a requirement that, when the laminate is impacted from an internal object (by an occupant's head during a collision), the laminate should fracture so as to dissipate energy during the event and minimize risk of injury to the occupant. This requirement has generally prevented direct use of high strength glass as both plies of a laminate structure. It has been discovered through extensive headform testing that exemplary laminate structures according to embodiments of the present disclosure having one or more layers of chemically strengthened glass with a residual surface compressive stress level of about 250 MPa to about 350 MPa, and preferably about 300 MPa, and with glass thicknesses of approximately 0.7 mm for each layer, consistently comply with these test requirements.

With continued reference to FIG. 6, another exemplary laminate structure 10 embodiment is illustrated having an outer layer 12 of glass with a thickness of less than or equal to 1.0 mm and having a residual surface CS level of between about 250 MPa to about 350 MPa with a DOL of greater than 60 microns, a polymeric interlayer 14, and an inner layer of glass 16 also having a thickness of less than or equal to 1.0 mm and having a residual surface CS level of between about 250 MPa to about 350 MPa with a DOL of greater than 60 microns. As illustrated, the laminate structure 10 can be flat or formed to three-dimensional shapes by bending the formed glass into a windshield or other glass structure utilized in vehicles.

Figure 7:
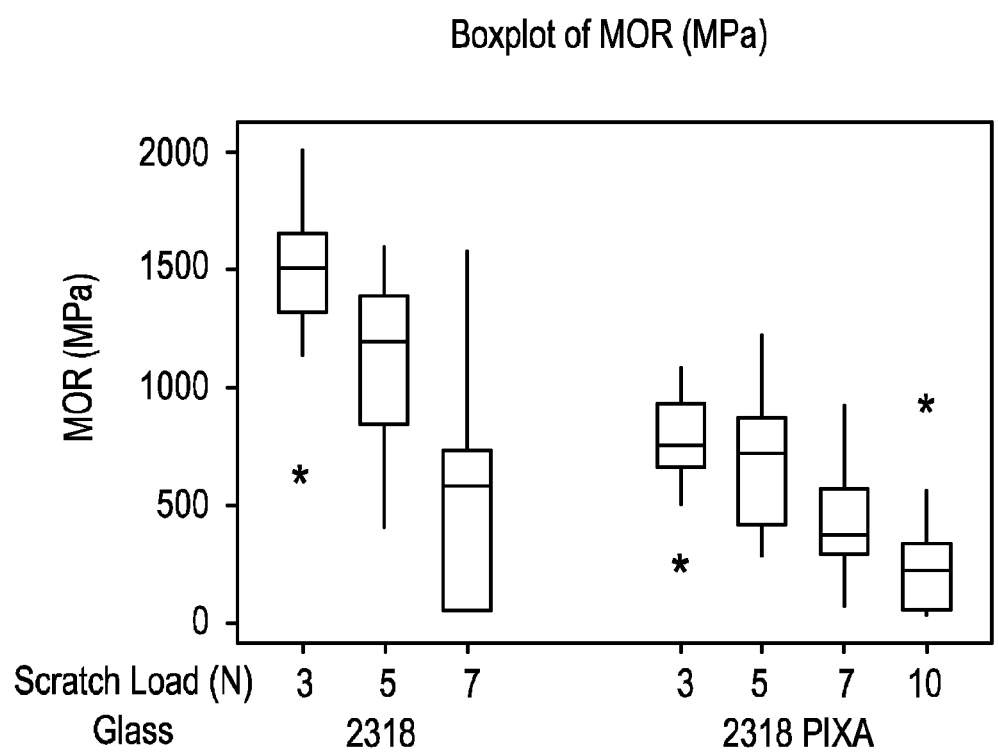
FIG. 7 is a graph illustrating retained strength data of some embodiments of the present disclosure.

FIG. 7 is a graph illustrating retained strength data of some embodiments of the present disclosure. With reference to FIG. 7, boxplots of retained strength data as measured in ring-on-ring of single layers of glass after scratching with a Knoop indenter at various loads (3N, 5N, 7N and 10 N) are illustrated. The graph provides an illustration of the benefit of extending the depth of the compressive layer by using an exemplary post ion exchange and annealing processes to create a final residual stress profile in the layers of the glass as described above. FIG. 7 provides plots of retained strength (as measured via ring-on-ring) of glass that have been scratched with a Knoop diamond tipped indenter at various load levels (3N, 5N, 7N and 10N). Typical ion-exchanged Gorilla® Glass with residual surface stress levels of approximately CS=700 and DOL=45 um did survive a 10 N scratch, whereas the post ion exchanged glass having CS=300 and DOL=70 um withstood such damage. Embodiments of the present disclosure may thus allow use of thinner glass layers than in conventional products to achieve weight reduction while maintaining a desired controlled fracture behavior when impacted from the inside of the vehicle.

Further Details Regarding Ion Exchange—Glass Compositions

As noted above the conditions of the ion exchange step and the annealing step are adjusted to achieve the desired compressive stress at the glass surface (CS), depth of compressive layer (DOL), and central tension (CT). While all such characteristics are important, the ion exchange step is particularly directed to the depth of compressive layer (DOL).

The ion exchange step is carried out by immersion of the glass sheet into a molten salt bath for a predetermined period of time, where ions within the glass sheet at or near the surface thereof are exchanged for larger metal ions, for example, from the salt bath. By way of example, the molten salt bath may include $KNO_3$, the temperature of the molten salt bath may within the range of about 400-500° C., and the predetermined time period may be within the range of about 4-hours, and preferably between about 4-10 hours. The incorporation of the larger ions into the glass strengthens the sheet by creating a compressive stress in a near surface region. A corresponding tensile stress is induced within a central region of the glass sheet to balance the compressive stress.

By way of further example, sodium ions within the glass sheet may be replaced by potassium ions from the molten salt bath, though other alkali metal ions having a larger atomic radius, such as rubidium or cesium, may replace smaller alkali metal ions in the glass. According to particular embodiments, smaller alkali metal ions in the glass sheet may be replaced by Ag+ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass sheet that results in a stress profile. The larger volume of the incoming ion produces a compressive stress (CS) on the surface and tension (central tension, or CT) in the center region of the glass. The compressive stress is related to the central tension by the following approximate relationship:

$$CS = CT\left(\frac{t - 2DOL}{DOL}\right)$$

where t is the total thickness of the glass sheet and DOL is the depth of exchange, also referred to as depth of compressive layer.

Any number of specific glass compositions may be employed in producing the glass sheet. For example, ion-exchangeable glasses that are suitable for use in the embodiments herein include alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

For example, a suitable glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3) \leq Al_2O_3 \leq 2$ mol. %; 2 mol. % $\leq Na_2O\ Al_2O_3 \leq 6$ mol. %; and 4 mol. % $\leq (Na_2O+K_2O) \leq Al_2O_3 \leq 10$ mol. %.

Advantages

One or more advantages of the above-discussed embodiments may include one or more of the following: an improved, retained strength and impact resistance as compared with non-strengthened glass; relatively higher compressive stress and higher compatibility with thin glass as compared with conventional thermal tempering of glass; relatively higher depth of compressive layer as compared with standard, single step, ion exchange techniques; and considerably lower costs to achieve a relatively high DOL as compared with conventional, single step ion exchange processes, due to reduced cycle time and less costly capital equipment requirements. For example, in the novel ion exchange process in a mixed alkali bath (e.g., 50% $KNO_B$+50% $NaNO_3$), lower processing costs are achieved. Notably, although sodium-containing baths can be employed to achieve lower CS, the corresponding reduction in diffusion speed significantly increases the time to reach relatively high DOL.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous.

As shown by the various configurations and embodiments illustrated in the figures, various methods for producing ion exchanged glass and resulting apparatus have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A laminate structure comprising:
a first glass layer;
a second glass layer; and
at least one polymer interlayer intermediate the first and second glass layers, wherein the first glass layer is comprised of a chemically strengthened glass having a thickness not exceeding 1.5 mm, a central tension (CT) of less than about 48 MPa, a surface compressive stress of less than about 350 MPa and a depth of layer (DOL) of compressive stress greater than 60 µm.

2. The laminate structure of claim 1 wherein the second glass layer is comprised of a chemically strengthened glass having a surface compressive stress of between about 250 MPa and about 350 MPa and a DOL of compressive stress greater than 60 µm.

3. The laminate structure of claim 1 wherein the surface compressive stress of the first glass layer is approximately 300 MPa.

4. The laminate structure of claim 1 wherein the thicknesses of the first and second glass layers are selected from the group consisting of a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm.

5. The laminate structure of claim 1 wherein the thicknesses of the first and second glass layers are different.

6. The laminate structure of claim 1 wherein the composition of the first and second glass layers are different.

7. The laminate structure of claim 1 wherein a surface of the first glass layer adjacent the interlayer is acid etched.

8. The laminate structure of claim 1 wherein a surface of the second glass layer opposite the interlayer is acid etched.

9. The laminate structure of claim 1 wherein the polymer interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof.

10. The laminate structure of claim 1 wherein the thickness of the interlayer is approximately 0.8 mm.

11. The laminate structure of claim 1 wherein the first glass layer has a central tension (CT) of less than 40 MPa.

12. The laminate structure of claim 1 wherein the first glass layer has a compressive stress (CS) of less than or equal to 300 MPa.

13. The laminate structure of claim 1 wherein the first glass layer has a depth of layer (DOL) greater than or equal to 80 µm.

14. The laminate structure of claim 1 wherein the first glass layer comprises alkali aluminosilicate or alkali alum inoborosilicate glass.

15. The laminate structure of claim 1 wherein the first glass layer comprises annealed, chemically strengthened glass.

16. A laminate structure comprising:
a first glass layer;
a second glass layer; and
at least one polymer interlayer intermediate the first and second glass layers, wherein the first glass layer is comprised of a chemically strengthened glass having a central tension (CT) of less than about 48 MPa, a surface compressive stress of less than about 350 MPa and a depth of layer (DOL) of compressive stress greater than 60 µm, and
wherein the second glass layer is comprised of a chemically strengthened glass having a surface compressive stress of between about 250 MPa and about 350 MPa and a DOL of compressive stress greater than 60 µm.

17. The laminate structure of claim 16 wherein the surface compressive stress of the first and second glass layers are each approximately 300 MPa.

18. The laminate structure of claim 16 wherein the thicknesses of the first and second glass layers are selected from the group consisting of a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm.

19. The laminate structure of claim 16 wherein the thicknesses of the first and second glass layers are different.

20. The laminate structure of claim 16 wherein a surface of the first glass layer adjacent the interlayer is acid etched.

21. The laminate structure of claim 16 wherein a surface of the second glass layer opposite the interlayer is acid etched.

22. The laminate structure of claim 16 wherein the polymer interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof.

23. The laminate structure of claim 16 wherein the second glass layer has a central tension (CT) of less than about 48 MPa.

24. The laminate structure of claim 16 wherein the thickness of the interlayer is approximately 0.8 mm.

25. The laminate structure of claim 16 wherein the first glass layer has a central tension (CT) of less than 40 MPa.

26. The laminate structure of claim 16 wherein the first glass layer has a compressive stress (CS) of less than or equal to 300 MPa.

27. The laminate structure of claim 16 wherein the first glass layer has a depth of layer (DOL) of greater than or equal to 80 µm.

28. The laminate structure of claim 16 wherein the first glass layer comprises alkali aluminosilicate or alkali alum inoborosilicate glass.

29. The laminate structure of claim 16 wherein the first glass layer comprises annealed, chemically strengthened glass.

\* \* \* \* \*